United States Patent [19]
Minear

[11] 3,800,209
[45] Mar. 26, 1974

[54] BATTERY CHARGER CIRCUIT

[76] Inventor: James P. Minear, 301 Lincoln St., Huntington Beach, Calif. 92648

[22] Filed: Nov. 24, 1972

[21] Appl. No.: 309,265

[52] U.S. Cl. .................. 320/25, 320/39, 320/DIG. 1
[51] Int. Cl. .............................................. H02j 7/10
[58] Field of Search ............. 320/21, 25, 26, 39, 40, 320/DIG. 1, DIG. 2

[56] References Cited
UNITED STATES PATENTS
3,343,060  9/1967  Ingraham ............................ 320/40
3,659,182  4/1972  Snedecker .......................... 320/25

*Primary Examiner*—J. D. Miller
*Assistant Examiner*—Robert J. Hickey

[57] ABSTRACT

A circuit for use in charging a battery from a DC power source through an SCR can be constructed so as to utilize control means for controlling the flow of current through the SCR in response to the charge in the battery and voltage responsive means for preventing a voltage from being supplied to the control means from the battery when the voltage of the battery indicates that it is charged. In the disclosed circuit such a voltage responsive means employs a zener diode for detecting battery voltage and a transistor for grounding the connection between the battery and the control means. The disclosed control means includes transistors for use in turning the SCR on and means for protecting against damage if the circuit is used with other than an intended battery.

2 Claims, 1 Drawing Figure

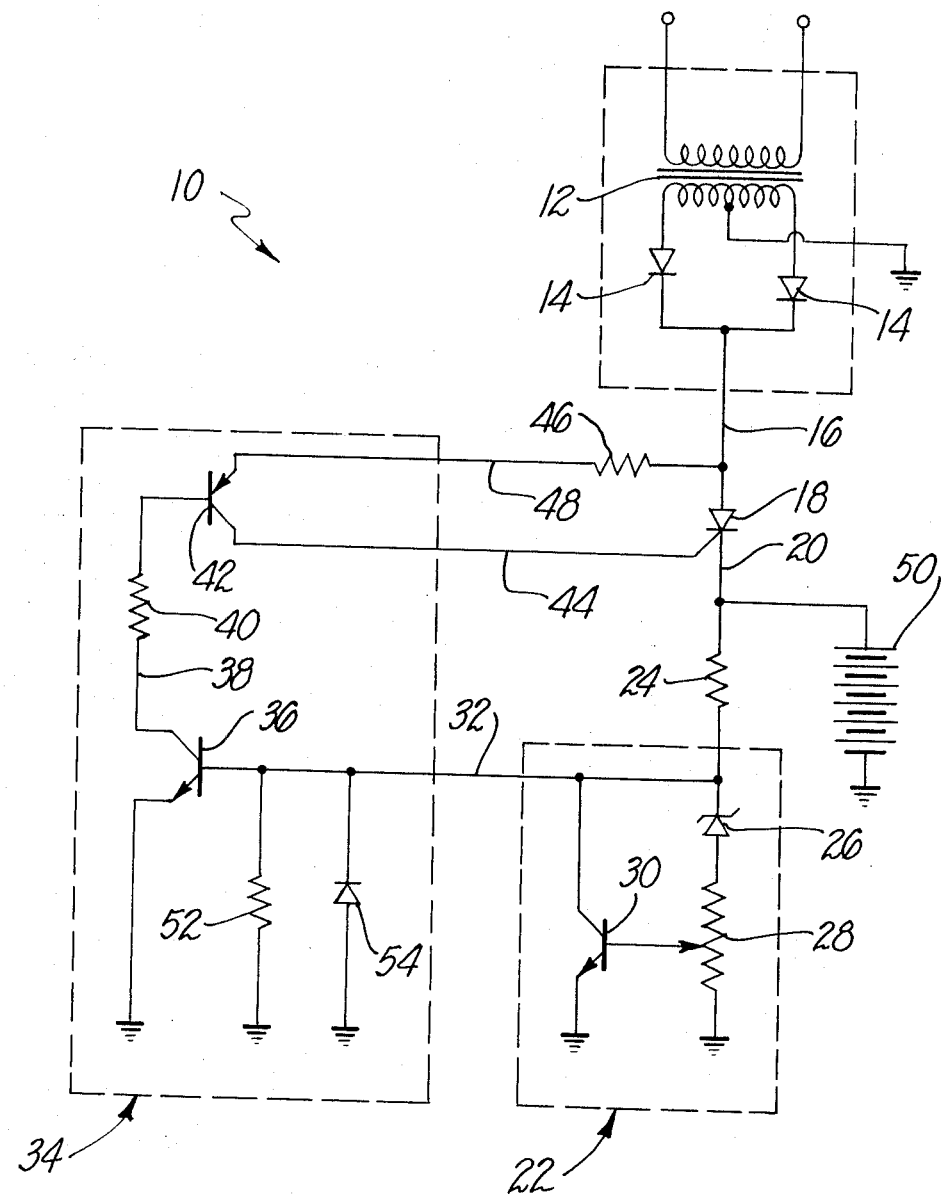

3,800,209

BATTERY CHARGER CIRCUIT

BACKGROUND OF THE INVENTION

A large number of different circuits have been proposed for use in charging a battery from a DC power source. As knowledge concerning SCRs (silicon controlled rectifiers) has developed such components have been used with increasing frequency in battery charger circuits. Frequently the operation of these SCRs in such circuits has been regulated utilizing zener diodes used to detect the voltage of a battery as such a battery is charged. As they have been employed, these zener diodes have normally served to cause the power supplied to such a battery to be cut off after the charge has reached a predetermined level indicating that the battery is either fully charged or is charged nearly to its capacity.

Prior battery charger circuits using SCRs and zener diodes are unquestionably considered to be of a utilitarian character. In spite of this it is considered that there is an existent need for a new and improved battery charger circuit. A number of factors are considered to contribute to this need. Frequently prior battery charger circuits have tended to be unnecessarily complex and expensive. Frequently such circuits have been vulnerable to damage if a battery should be erroneously connected to them. It is considered that most of these prior circuits have been difficult to adjust.

SUMMARY OF THE INVENTION

A principal objective of the present invention is to fulfill the need indicated in the preceding discussion. Thus, the invention is intended to teach the construction of new and improved battery charger circuits. The invention is also, intended to provide battery charger circuits which are not significantly expensive, which may be easily and conveniently constructed, which may be easily used and which are capable of prolonged, reliable performance.

In accordance with this invention these and various related objectives of it as will be apparent from a detailed consideration of the remainder of this specification are achieved by utilizing in a circuit for use in supplying a current from a DC power source through an SCR to a battery in order to charge the battery, the improvement which comprises: control means for controlling the flow of current through the SCR in response to the charge on a battery connected to the circuit and voltage responsive means for preventing a voltage from being supplied to the control means from a battery connected to the circuit when the voltage of such a battery indicates that it has been charged to a desired extent.

BRIEF DESCRIPTION OF THE DRAWING

Unfortunately no summary can adequately indicate all of the facets and features of an invention. Further details relative to the present invention are best explained with reference to the accompanying drawing in which:

The FIGURE shows a presently preferred embodiment or form of a battery charger circuit in accordance with this invention.

The illustrated circuit utilizes certain intangible concepts constituting the invention which are verbally defined in the appended claims. Those skilled in the art of electronic circuit design will be able to utilize these concepts in various circuits which differ from the illustrated circuit, but which retain the essential mode of operation of the illustrated circuit. For this reason the accompanying drawing and the subsequent description of it are not to be taken as limiting the scope of the concepts for which protection is claimed.

DETAILED DESCRIPTION

In the drawing there is shown a complete circuit 10 in accordance with this invention which includes a conventional center tapped transformer 12, the center tap of which is connected to ground and the legs of which feed through conventional diodes 14 to a common junction connected to a line 16 used to supply full-wave rectified DC power to the anode of an SCR 18. The cathode of this SCR is connected through another line 20 to what is referred to herein as a voltage responsive means 22 through a current limiting resistor 24.

This means 22 is indicated by a rectangle of dotted lines. It includes a zener diode 26, the cathode of which is connected to the line 20 and the anode of which is connected to one end of a conventional potentiometer 28. The other end of this potentiometer 28 is grounded and the wiper on this potentiometer 28 is directly connected to the base of an npn transistor 30. The emitter of this transistor 30 is also grounded while the collector of this transistor is connected to another line 32 which is connected to the line 20 between the zener diode 26 and the current limiting resistor 24.

This line 32 connects the voltage responsive means 22 to what is referred to as a control means 34. This means 34 is also indicated on the drawing by a rectangle defined by dotted lines. It includes an npn transistor 36, the base of which is directly connected to the line 32. The emitter of the transistor 36 is grounded as shown while the collector of this transistor 36 is connected by another line 38 through another resistor 40 to the base of a third transistor 42. The collector of this transistor 42 is directly connected to the gate of the SCR 18 by another line 44 while the emitter of this transistor 42 is connected to the line 16 through a current limiting resistor 46 by a line 48.

When the circuit 10 is to be utilized for its intended purpose the positive terminal of a battery 50 to be charged is connected to the line 20 between the SCR 18 and the current limiting resistor 24, and the negative terminal of the battery is grounded. It is considered obvious that appropriate, conventional connections may be used to in effect facilitate the battery 50 being incorporated into the circuit 10 in this manner. In nearly all cases a battery such as the battery 50 to be recharged using the circuit 10 will have some vestage of a residual charge.

In the circuit 10 the voltage of the battery 50 will be applied to the base of the transistor 36 through the lines 20 and 32. When this occurs this transistor 36 will be rendered conductive so that power will be supplied from it through the resistor 40 to the base of the transistor 42. This will render this transistor 42 conductive so that thereafter power supplied to the emitter of the transistor 42 through the lines 16 and 48 will be released to the gate of the SCR 18. This will render the SCR conductive so that it will directly convey full-wave rectified current from the line 16 to the line 20 and, thence, to the battery 50. This rectified current will, of course, charge the battery 50.

As the battery 50 becomes charged the voltage of this battery 50 will, of course, increase. When the battery charge is increased to the breakdown voltage of the zener diode 26 this zener diode 26 will "breakdown" so that the current will flow to the potentiometer 28. This potentiometer 28 will exercise its usual dividing action so that some current will go to the base of the transistor 30. This will turn on the transistor 30 so as to shunt the current flowing through the lines 20 and 32 to the base of the transistor 36 to ground. This grounding of the base of the transistor 36 will have the effect of turning the transistor 36 off and this in turn will result in the transistor 42 being turned off. Thereafter, current will not be supplied through the transistor 42 to the gate of the SCR 18. When this occurs the SCR 18 will no longer be conductive and further charging of the battery 50 will cease.

It will be apparent from this that the essential components of the circuit 10 described constitute an effective, composite structure for preventing overcharging of the battery 50. Such overcharging is normally considered to be highly detrimental. This circuit 10, however, does not only include the basic parts indicated in the preceding discussion, but includes a number of other components which contribute to the utilization and desirablility of this circuit.

Preferably the circuit 10 utilizes a small base resistor 52 which is connected between the line 32 and ground adjacent to the base of the transistor 36 for the purpose of setting the battery voltage necessary to turn on the transistor 36. Preferably there is also used a diode 54 between the line 32 and ground adjacent to the base of the transistor 36 for the purpose of protecting against damage if a battery such as the battery 50 should be hooked up to the circuit 10 so that the positive terminal of this battery is grounded instead of the negative.

This diode 54 serves to shunt a signal of undesired polarity to ground if a battery should be wrongly connected. Both the resistor 52 and the diode 54 are considered to be simple, effective means of preventing damage to the entire circuit 10 if this circuit is used erroneously. Such erroneous use can occur if an effort is made to use a circuit 10 with a battery 50 having different characteristics than those contemplated in selecting the components of the circuit 10.

In the circuit 10 the potentiometer 28 may be easily adjusted so as to set the voltage at which the zener diode 26 will breakdown. This makes it possible to easily adjust the circuit 10 so as to obtain a precise value to which a battery can be charged with this circuit. From an economic standpoint the use of this potentiometer 28 is quite advantageous in that it makes it unnecessary to utilize a zener diode 26 having a precise breakdown voltage.

It should also be noted that the circuit 10 is operated so that in effect there is intermittent operation of the transistor 42. This is related to the fact that full-wave rectified DC current is supplied to the transistor 42 and is passed by this transistor in the manner indicated in the preceding discussion. As a consequence of the mode of operation described it is considered that undue heating of the transistor 42 is prevented.

I claim:

1. In a circuit for use in supplying a current from a DC power source through an SCR to a battery connected to the circuit in order to charge the battery, the improvement which comprises:

control means for controlling the flow of current through said SCR in response to the charge on a battery connected to the circuit, said control means being connected to said SCR and being adapted to be connected to the battery, said control means including a first transistor means for supplying a current to the gate of said SCR connected to said power source and connected directly to the gate of said SCR so as to be capable of passing a current from said power source to control when said SCR will pass a current directly from said power source to charge a battery connected to said circuit and second transistor means on in response to the voltage of a battery being charged in said circuit, voltage responsive means for preventing a voltage from being supplied to said control means from a battery connected to said circuit when the voltage of such a battery indicates that it is charged, said voltage responsive means being connected to said control means so that a battery connected to said circuit is connected to said control means through said voltage responsive means, said voltage responsive means includes a zener diode for detecting the voltage of a battery being charged and a third transistor means for shunting any current supplied from such a battery to said control means, said third transistor means being connected to said zener diode so as to be activated to shunt current passing through said voltage responsive means to said control means away from said control means when the voltage of a battery being charged exceeds the breakdown voltage of said zener diode so that said zener diode passes current, diode means for shunting a current of other than a desired polarity from said second transistor means if a battery should be connected to said circuit improperly, resistor means connected to said second transistor means for controlling the voltage necessary to actuate said second transistor means.

2. A circuit as claimed in claim 1 wherein:
said DC power source comprises a source of full-wave rectified AC current.

* * * * *